United States Patent
Shellhammer et al.

(10) Patent No.: US 11,160,020 B2
(45) Date of Patent: Oct. 26, 2021

(54) MULTICARRIER ON-OFF KEYING SYMBOL RANDOMIZER

(71) Applicant: QUALCOMM Incorporated, San Diego, CA (US)

(72) Inventors: Stephen Jay Shellhammer, Ramona, CA (US); Didier Johannes Richard Van Nee, Tull en 't Waal (NL); Bin Tian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/397,140

(22) Filed: Apr. 29, 2019

(65) Prior Publication Data

US 2019/0342828 A1    Nov. 7, 2019

Related U.S. Application Data

(60) Provisional application No. 62/665,293, filed on May 1, 2018.

(51) Int. Cl.
| | |
|---|---|
| *H04W 52/02* | (2009.01) |
| *H04L 27/04* | (2006.01) |
| *H04L 27/36* | (2006.01) |
| *H04L 27/26* | (2006.01) |

(52) U.S. Cl.
CPC ......... *H04W 52/0212* (2013.01); *H04L 27/04* (2013.01); *H04L 27/2627* (2013.01); *H04L 27/361* (2013.01)

(58) Field of Classification Search
CPC ... H04L 27/361; H04L 27/04; H04L 27/2627; H04L 5/0007; H04W 52/0212
See application file for complete search history.

(56) References Cited

U.S. PATENT DOCUMENTS

| | | | |
|---|---|---|---|
| 9,178,735 B1 | 11/2015 | Ho et al. | |
| 10,129,064 B1 * | 11/2018 | Lee | ...... H04L 27/2627 |
| 10,491,261 B1 * | 11/2019 | Al-Eidan | ...... H04B 1/707 |

(Continued)

OTHER PUBLICATIONS

Printout from website—Cyclic Shift (https://www.sciencedirect.com/topics/engineering/cyclic-shift) (Year: NA).*

(Continued)

*Primary Examiner* — Redentor Pasia
(74) *Attorney, Agent, or Firm* — Kevin T. Cheatham

(57) ABSTRACT

Methods, systems, and devices for wireless communications are described. An access point (AP) may identify a sequence of on symbols and off symbols for transmission to a wake-up radio (WUR) of a wireless device. The AP may assign a modulation symbol from a set of possible modulation symbol waveforms to at least each on symbol in the sequence. The modulation symbol waveforms may be assigned to sequential on symbols in a random or pseudorandom order, e.g., by applying a random phase rotation to a stored modulation symbol waveform, by applying a random cyclic shift to a stored modulation symbol waveform, or by applying a random or pseudorandom phase-shift keying value to each subcarrier in a multicarrier system to generate a modulation symbol waveform. The AP may transmit the sequence to the WUR based at least in part on the assigned modulation symbol waveforms.

20 Claims, 14 Drawing Sheets

(56) References Cited

U.S. PATENT DOCUMENTS

| | | | | |
|---|---|---|---|---|
| 2005/0168324 | A1* | 8/2005 | Fischer | G06K 7/0008 |
| | | | | 340/10.3 |
| 2007/0047665 | A1* | 3/2007 | Friend | H04L 27/2602 |
| | | | | 375/260 |
| 2012/0327975 | A1* | 12/2012 | Michaels | H04B 1/707 |
| | | | | 375/140 |
| 2016/0269054 | A1* | 9/2016 | Kim | H04B 1/0475 |
| 2018/0019902 | A1* | 1/2018 | Suh | H04L 27/2602 |
| 2018/0227070 | A1* | 8/2018 | Suh | H04J 13/12 |
| 2019/0306797 | A1* | 10/2019 | Azizi | H04L 5/0053 |
| 2020/0127756 | A1* | 4/2020 | Iwai | H04W 52/0235 |
| 2020/0162302 | A1* | 5/2020 | Sahin | H04L 5/0007 |
| 2020/0322889 | A1* | 10/2020 | Chitrakar | H04W 52/0235 |

OTHER PUBLICATIONS

International Search Report and Written Opinion—PCT/US2019/029922—ISA/EPO—dated Jul. 4, 2019.

Jia J.J., (Huawei Technologies) et al., "Performance Investigations on Single-carrier and Multiple-carrier-based WUR", IEEE Draft, 11-17-0373-00-00BA-Performance-Investigations-on-Single-Carrier-and-Multiple-Carrier-Based-WUR, IEEE-SA Mentor, Piscataway, NJ USA, vol. 802.11ba, Mar. 13, 2017 (Mar. 13, 2017), pp. 1-17, XP068115452, Retrieved from the Internet: URL:https://mentor.ieee.org/802.11/dcn/17/11-17-0373-00-00ba-performance-investigations-on-single-carrier-and-multiple-carrier-based-wur.pptx [retrieved on Mar. 13, 2017], Slide 13.

Lopez M., (Ericsson) et al., "MC-OOK Symbol Design", IEEE Draft, 11-18-0479-02-00BA-MC-OOK-Symbol-Design, IEEE-SA Mentor, Piscataway, NJ USA, vol. 802.11ba, No. 2, Mar. 7, 2018, (Mar. 7, 2018), pp. 1-20, XP068125481, Retrieved from the Internet: URL:https://mentor.ieee.org/802.11/dcn/18/11-18-0479-02-00ba-mc-ook-symbol-design.pptx [retrieved on Mar. 7, 2018], Slide 2.

Shellhammer S., (Qualcomm) et al., "On Symbol Generation", IEEE Draft, 11-18-0584-02-00BA-on-Symbol-Generation, IEEE-SA Mentor, Piscataway, NJ USA, vol. 802.11ba, No. 2, Mar. 29, 2018 (Mar. 29, 2018), pp. 1-5, XP068125628, Retrieved from the Internet: URL:https://mentor.ieee.org/802.11/dcn/18/11-18-0584-02-00ba-on-symbol-generation.pptx [retrieved on Mar. 29, 2018], Slide 3.

* cited by examiner

MULTICARRIER ON-OFF KEYING SYMBOL RANDOMIZER

CROSS REFERENCES

The present application for patent claims priority to U.S. Patent Application No. 62/665,293 by Shellhammer et al., entitled "Multicarrier On-Off Keying Symbol Randomizer," filed May 1, 2018, assigned to the assignee hereof.

BACKGROUND

The following relates generally to wireless communications, and more specifically to multicarrier on-off keying symbol randomizer.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include a first wireless device (e.g., an access point (AP)) that may communicate with one or more second wireless devices (e.g., stations (STAs) or mobile devices). The AP may be coupled to a network, such as the Internet, and may enable a mobile device to communicate via the network (or communicate with other devices coupled to the access point). A wireless device may communicate with a network device bi-directionally. For example, in a WLAN, a wireless station (STA) may communicate with an associated AP via downlink (DL) and uplink (UL). The DL (or forward link) may refer to the communication link from the AP to the station, and the UL (or reverse link) may refer to the communication link from the station to the AP.

In some examples, information may be transmitted from one wireless device to another wireless device in a wireless communications system using on-off keying. In on-off keying, the information is indicated based on the presence or absence of a signal during each symbol. For example, the presence of the signal during a particular symbol may indicate a binary "1", while the absence of the signal during the symbol indicates a "0".

SUMMARY

The described techniques relate to improved methods, systems, devices, or apparatuses that support multicarrier on-off keying symbol randomizer. Generally, the described techniques provide for randomizing modulation symbol waveforms over an on-off keying sequence. A first wireless device (e.g., an access point (AP)) may identify a sequence of on symbols and off symbols for transmission to a wake-up radio (WUR) of a second wireless device. The AP may assign a modulation symbol from a set of possible modulation symbol waveforms to at least each on symbol in the sequence. The modulation symbol waveforms may be assigned to sequential on symbols in a random or pseudo-random order, e.g., by applying a random phase rotation to a stored modulation symbol waveform for each on symbol, by applying a random cyclic shift to a stored modulation symbol waveform for each on symbol, or by applying a random or pseudorandom phase-shift keying value to each subcarrier in a multicarrier system to generate a modulation symbol waveform for each on symbol. The AP may transmit the sequence to the WUR based at least in part on the assigned modulation symbol waveforms.

A method of wireless communication is described. The method may include identifying, by a first wireless device, a sequence of on symbols and off symbols for transmission to a WUR of a second wireless device, assigning a modulation symbol waveform from a set of possible modulation symbol waveforms to at least each on symbol in the sequence, where the modulation symbol waveforms are assigned to sequential on symbols in a random or pseudorandom order, and transmitting the sequence to the WUR of the second wireless device using multi-carrier on-off keying (MC-OOK) based on the assigned modulation symbol waveforms.

A first wireless device is described. The first wireless device may include an interface and a wireless modem. The wireless modem may be configured to identify, a sequence of on symbols and off symbols for transmission to a WUR of a second wireless device, assign a modulation symbol waveform from a set of possible modulation symbol waveforms to at least each on symbol in the sequence, where the modulation symbol waveforms are assigned to sequential on symbols in a random or pseudorandom order, and output the sequence over the interface for transmission to the WUR of the second wireless device using multi-carrier on-off keying (MC-OOK) based on the assigned modulation symbol waveforms.

Another apparatus for wireless communication is described. The apparatus may include means for identifying, by a first wireless device, a sequence of on symbols and off symbols for transmission to a WUR of a second wireless device, assigning a modulation symbol waveform from a set of possible modulation symbol waveforms to at least each on symbol in the sequence, where the modulation symbol waveforms are assigned to sequential on symbols in a random or pseudorandom order, and transmitting the sequence to the WUR of the second wireless device using multi-carrier on-off keying (MC-OOK) based on the assigned modulation symbol waveforms.

A non-transitory computer-readable medium storing code for wireless communication is described. The code may include instructions executable by a processor to identify, by a first wireless device, a sequence of on symbols and off symbols for transmission to a WUR of a second wireless device, assign a modulation symbol waveform from a set of possible modulation symbol waveforms to at least each on symbol in the sequence, where the modulation symbol waveforms are assigned to sequential on symbols in a random or pseudorandom order, and transmit the sequence to the WUR of the second wireless device using multi-carrier on-off keying (MC-OOK) based on the assigned modulation symbol waveforms.

In some examples of the method, apparatuses, and non-transitory computer-readable medium described herein, assigning the modulation symbol waveform may include operations, features, means, or instructions for applying a random or pseudorandom phase rotation to a stored modulation symbol waveform.

In some examples of the method, apparatuses, and non-transitory computer-readable medium described herein, applying the random or pseudorandom phase rotation may include operations, features, means, or instructions for determining the random or pseudorandom phase rotation based on a random number generator.

In some examples of the method, apparatuses, and non-transitory computer-readable medium described herein, the random or pseudorandom number generator includes a linear feedback shift register.

In some examples of the method, apparatuses, and non-transitory computer-readable medium described herein, determining the random or pseudorandom phase rotation may include operations, features, means, or instructions for initializing the linear feedback shift register with a fixed seed.

In some examples of the method, apparatuses, and non-transitory computer-readable medium described herein, determining the random or pseudorandom phase rotation may include operations, features, means, or instructions for initializing the linear feedback shift register with a random or pseudorandom seed.

Some examples of the method, apparatuses, and non-transitory computer-readable medium described herein may further include operations, features, means, or instructions for transmitting the random or pseudorandom seed to the wireless device.

In some examples of the method, apparatuses, and non-transitory computer-readable medium described herein, applying the random or pseudorandom phase rotation may include operations, features, means, or instructions for determining the random or pseudorandom phase rotation based on a stored random or pseudorandom number sequence.

In some examples of the method, apparatuses, and non-transitory computer-readable medium described herein, assigning the modulation symbol waveform may include operations, features, means, or instructions for applying a random or pseudorandom cyclic shift to a stored modulation symbol waveform.

In some examples of the method, apparatuses, and non-transitory computer-readable medium described herein, assigning the modulation symbol waveform may include operations, features, means, or instructions for applying a random or pseudorandom phase-shift keying value to each of a set of subcarriers of a multicarrier system to generate the modulation symbol waveform.

In some examples of the method, apparatuses, and non-transitory computer-readable medium described herein, the modulation symbol waveform includes an orthogonal frequency division multiplexing symbol waveform and the random or pseudorandom phase-shift keying value includes one of a binary phase-shift keying value and a quadrature phase-shift keying value.

Some examples of the method, apparatuses, and non-transitory computer-readable medium described herein may further include operations, features, means, or instructions for assigning a modulation symbol waveform from a set of possible modulation symbol waveforms to each off symbol in the sequence, where the modulation symbol waveforms may be assigned to sequential symbols in the sequence in a random or pseudorandom order.

DETAILED DESCRIPTION

On-off keying may be used for transmitting information in a wireless communications system. Because the information is indicated by the presence or absence of a waveform during a particular symbol, the exact structure of the waveform itself may be irrelevant to whether the receiving device understands the message. As such, some wireless devices may use a single waveform for each on symbol.

However, when the same waveform is used for each on symbol, the waveform may have strong autocorrelation values at the spacing of the symbol duration, or of multiples thereof. Such autocorrelation may lead to spectral lines in the power spectral density, which can in turn lead to significant power in a narrow bandwidth. The use of such high power in a narrow bandwidth may pose regulatory issues, because some regulators have limits on the amount of power within a narrow bandwidth.

In order to avoid such regulatory issues, a wireless device (e.g., an access point (AP)) may assign modulation symbol waveforms from a set of possible modulation symbol waveforms to at least each on symbol in the sequence. The modulation symbol waveforms may be assigned to sequential on symbols in a random or pseudorandom order such that autocorrelation may be mitigated.

In some examples, the wireless device may assign modulation symbol waveforms from a set of possible modulation symbol waveforms by applying a random or pseudorandom phase rotation to a stored modulation symbol waveform. In some other examples, the wireless device may assign modulation symbol waveforms from a set of possible modulation symbol waveforms by applying a random or pseudorandom cyclic shift to a stored modulation symbol waveform. The random or pseudorandom phase rotation or cyclic shift may be determined based at least in part on a random or pseudorandom number (e.g., a random or pseudorandom bit or string of bits). The random or pseudorandom number may be generated by a random number generator (e.g., a linear feedback shift register).

In some examples, the wireless device may assign modulation symbol waveforms from a set of possible modulation symbol waveforms by applying a random or pseudorandom phase-shift keying value to each of a plurality of subcarriers of a multicarrier system. The resulting modulation symbol waveform may be used for the on symbol. In some examples, the modulation symbol waveform may be an orthogonal frequency division multiplexing (OFDM) symbol waveform, and the random or pseudorandom phase-shift keying value may be a binary phase-shift keying (BPSK) value or a quadrature phase-shift keying (QPSK) value.

Aspects of the disclosure are initially described in the context of a wireless communications system. Aspects of the disclosure are further illustrated by and described with reference to apparatus diagrams, system diagrams, and flowcharts that relate to multicarrier on-off keying symbol randomizer.

Figure 1:
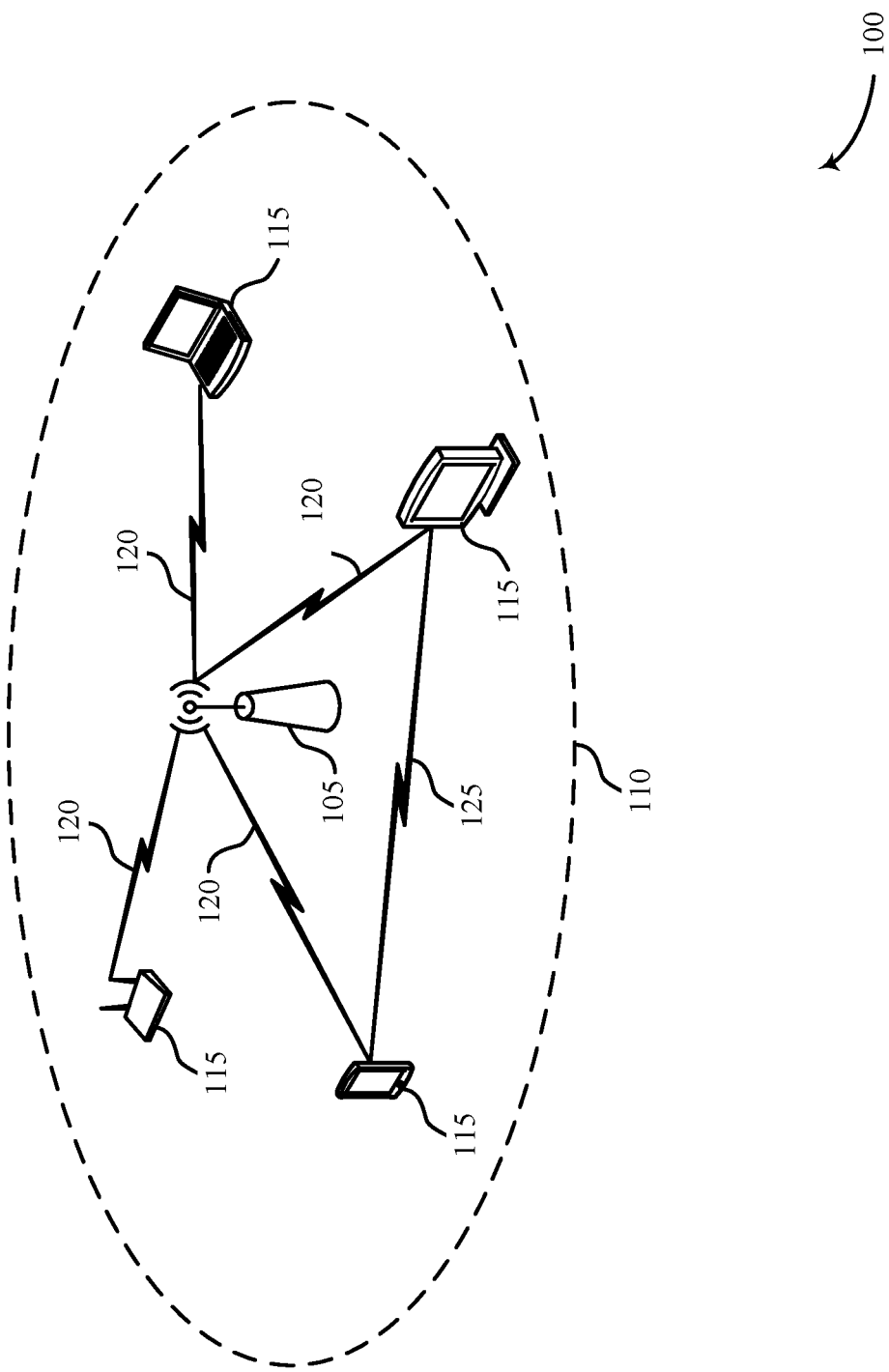
FIG. 1 illustrates an example of a system for wireless communications that supports multicarrier on-off keying symbol randomizer in accordance with aspects of the present disclosure.

FIG. 1 illustrates a wireless communications system 100 (also known as a Wi-Fi network) configured in accordance with various aspects of the present disclosure. The wireless communications system 100 (e.g. wireless local area network (WLAN)). may include a first wireless device (e.g., an AP 105) and multiple associated wireless devices (e.g., stations (STAs) 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the wireless communications system 100. An extended network station (not shown) associated with the wireless communications system 100 may be connected to a wired or wireless distribution system that may allow multiple APs 105 to be connected in an ESS.

The AP 105 may include a communications manager 101, which may randomize modulation symbol waveforms over an on-off keying sequence. The communications manager 101 may identify a multicarrier sequence of on symbols and off symbols for transmission to a wake-up radio (WUR) of a STA 115. In some examples, the sequence of on symbols and off symbols may be defined by a technical specification and stored at the AP 105.

The communications manager 101 may assign a modulation symbol waveform from a set of possible modulation symbol waveforms to at least each on symbol (e.g., to each on symbol, or each symbol regardless of whether it is an on symbol or off symbol), in the sequence of on symbols and off symbols. The modulation symbol waveforms may be assigned to sequential symbols (e.g., on symbols, or all symbols) in a random or pseudorandom order.

The communications manager 101 may assigned modulation symbol waveforms to symbols in a random or pseudorandom order by randomly or pseudorandomly selecting a modulation symbol waveform from the set of possible modulation symbol waveforms for each symbol. In some examples, the communications manager 101 may select a random or pseudorandom phase rotation or cyclic shift for each symbol, and may apply the random or pseudorandom phase rotation or cyclic shift to a stored modulation symbol waveform to generate the modulation symbol waveform for the symbol. In some other examples, the communications manager 101 may select a random or pseudorandom phase-shift keying value for each subcarrier in a multicarrier system for each symbol, may generate the modulation symbol waveform for the symbol by using the randomly or pseudorandomly selected phase-shift keying values. The phase-shift keying values may be, for example, binary phase-shift keying (BPSK) values or quadrature phase-shift keying (QPSK) values.

In some examples, the random or pseudorandom phase rotation, cyclic shift, or phase-shift keying values may be selected based at least in part on a random or pseudorandom number (e.g., a random or pseudorandom bit or string of bits). In some examples, the random or pseudorandom number may be generated by a random number generator (e.g., a linear feedback shift register). The random number generator may be initialized with a seed, which may be a fixed seed or a variable seed (e.g., a random or pseudorandom seed). In some examples, the communications manager 101 may cause the AP 105 to transmit the seed to the STA 115. In some other examples, random or pseudorandom number may be determined based at least in part on a stored random or pseudorandom number.

The communications manager 101 may generate a transmission sequence based at least in part on the sequence of on symbols and off symbols. The transmission sequence may indicate no transmission is to be made during the off symbols, and may indicate that a corresponding assigned modulation symbol waveform is to be transmitted during each on symbol. The communications manager 101 may cause the AP 105 to transmit in accordance with the transmission sequence.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The wireless communications system 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communications system 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

Figure 2:
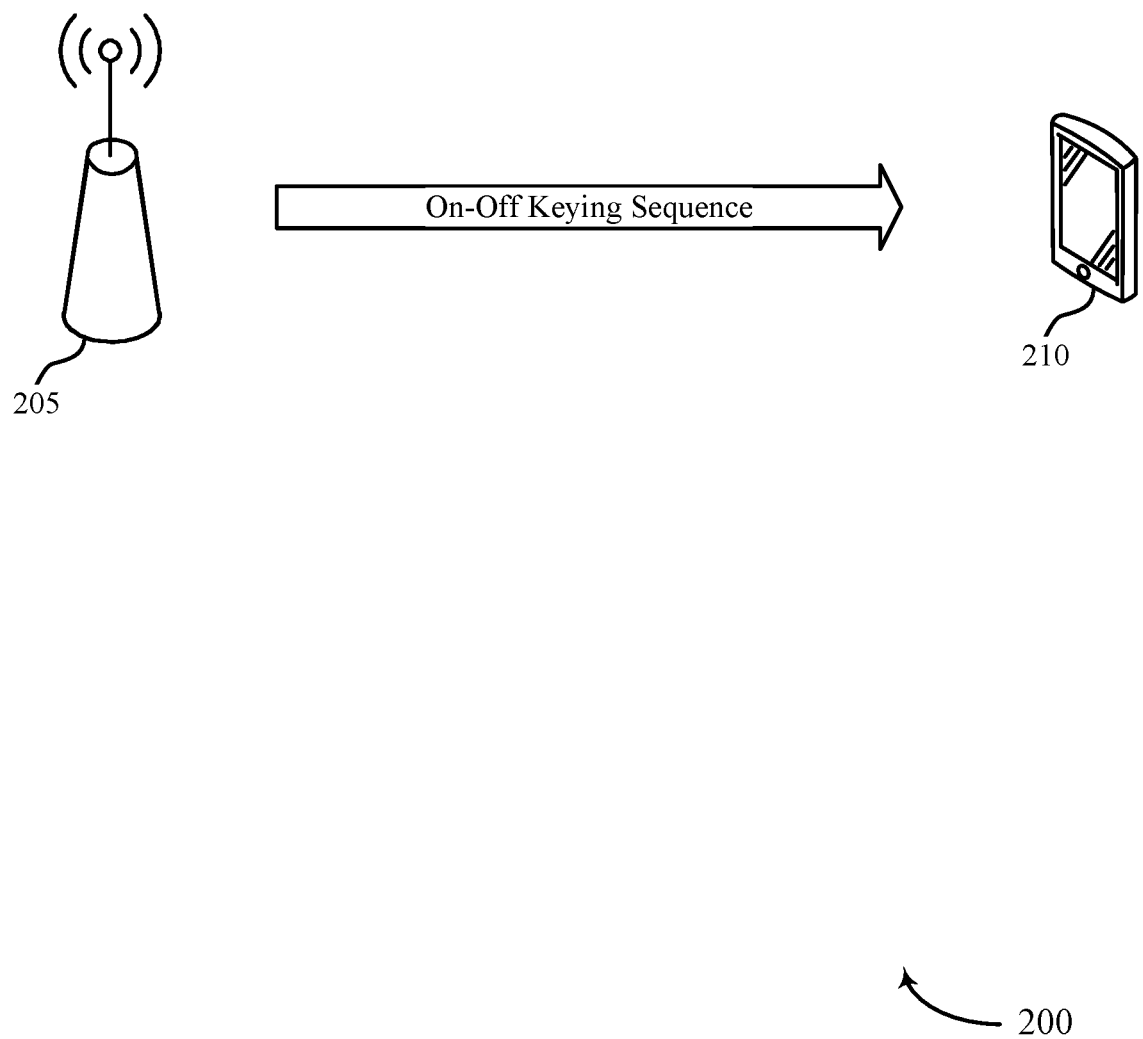
FIG. 2 illustrates an example of a wireless communications system that supports multicarrier on-off keying symbol randomizer in accordance with aspects of the present disclosure.

FIG. 2 illustrates an example of a wireless communications system 200 that supports multicarrier on-off keying symbol randomizer in accordance with aspects of the present disclosure. In some examples, wireless communications system 200 may implement aspects of wireless communications system 100.

The wireless communications system 200 may include an AP 205 and a wireless station (STA) 210. The AP 205 may be an example of aspects of AP 105 described with reference to FIG. 1, and the STA 210 may be an example of aspects of STA 115 described with reference to FIG. 1.

The STA 210 may have an active communication mode, during which the STA 210 actively exchanges messages with other devices (e.g., the AP 205), and an idle communication mode, during which the STA 210 does not actively exchange messages with other devices. During the idle communication mode, the STA 210 may listen to communications on the wireless communications medium in case another wireless device (e.g., the AP 205) has information to transmit to the STA 210, in which case the STA 210 may transition to active communication mode. However, the use of the main radio in idle mode may result in significant energy waste. In some examples, the STA 210 may include a WUR which may consume less power than the main radio. The STA 210 may use to WUR during idle mode to decrease energy consumption in idle mode.

Because the WUR of the STA 210 uses low amounts of power, the indication that the STA 210 should switch to active communication mode may be simple. In some examples, the AP 205 may use on-off keying to indicate that the STA 210 should switch to active communication mode.

The AP 205 may identify a sequence of on symbols and off symbols for transmission to the WUR of the STA 210. The on-off key sequence may be a multicarrier on-off sequence. In some examples, the on-off key sequence may be defined in a technical specification and stored at the AP 205.

The AP 205 may then assign a modulation symbol waveform from a set of possible modulation symbol waveforms to at least each on symbol in the sequence of on symbols and off symbols. The modulation symbol waveforms may be assigned to sequential on symbols in a random or pseudorandom order. In some examples, the modulation symbol waveforms may also be assigned to off symbols. The modulation symbol waveforms may be assigned to sequential on symbols by randomly or pseudorandomly selecting one of the possible modulation symbol waveforms for at least each on symbol.

In some examples, the set of possible modulation symbol waveforms may consist of a stored modulation symbol waveform with one of N possible phase rotations. The modulation symbol waveform for a symbol may be assigned by applying a random or pseudorandom phase rotation to the stored modulation symbol.

In some examples, the set of possible modulation symbol waveforms may consist of a stored modulation symbols waveform with one of N possible cyclic shift values. The modulation symbol waveform for a symbol may be assigned by applying a random or pseudorandom cyclic shift to the stored modulation symbol.

In some examples, the set of possible modulation symbols may consist of a set of N×M modulation symbol waveforms, where N is the number of possible phase-shift keying values and M is the number of subcarriers in the multicarrier system. The modulation symbol waveform for a symbol may be assigned by generating a random or pseudorandom phase-shift keying value for each of the M subcarriers. The phase-shift keying value may be, for example, a binary phase-shift keying (BPSK) value or a quadrature phase-shift keying (QPSK) value, and the resulting modulation symbol waveform may be an orthogonal frequency division multiplexing (OFDM) modulation symbol waveform.

In some examples, the random or pseudorandom phase rotation, cyclic shift, or phase-shift keying value may be determined based at least in part on a random or pseudorandom number (e.g., a random or pseudorandom bit or string of bits). In some examples, the random or pseudorandom number may be determined based at least in part on a random number generator (e.g., a linear feedback shift register). The random number generator may be initialized with a seed, which may be a fixed seed or a variable (e.g., random or pseudorandom) seed. In some examples, the AP 205 may transmit the seed (e.g., the variable seed) to the STA 210. When the STA 210 is a coherent receiver, the STA 210 may use the received seed to compensate at the receiver for the random or pseudorandom assignments (e.g., the random or pseudorandom phase rotation or cyclic shift). In some other examples, the random or pseudorandom number may be determined based at least in part on a stored random or pseudorandom number. For example, a linear feedback shift register may generate a pseudorandom string of bits that repeats every 127 bits. Instead of using the linear feedback shift register, the AP 205 may instead store a random or pseudorandom string of bits (which may have more than 127 bits).

The AP 205 may transmit the sequence of on symbols and off symbols to the WUR of the STA 210 using multicarrier on-off keying (MC-OOK). The transmitted sequence may be based at least in part on the assigned modulation symbol waveforms. For example, the AP 205 may transmit the corresponding assigned modulation symbol waveform during each on symbol.

Figure 3:
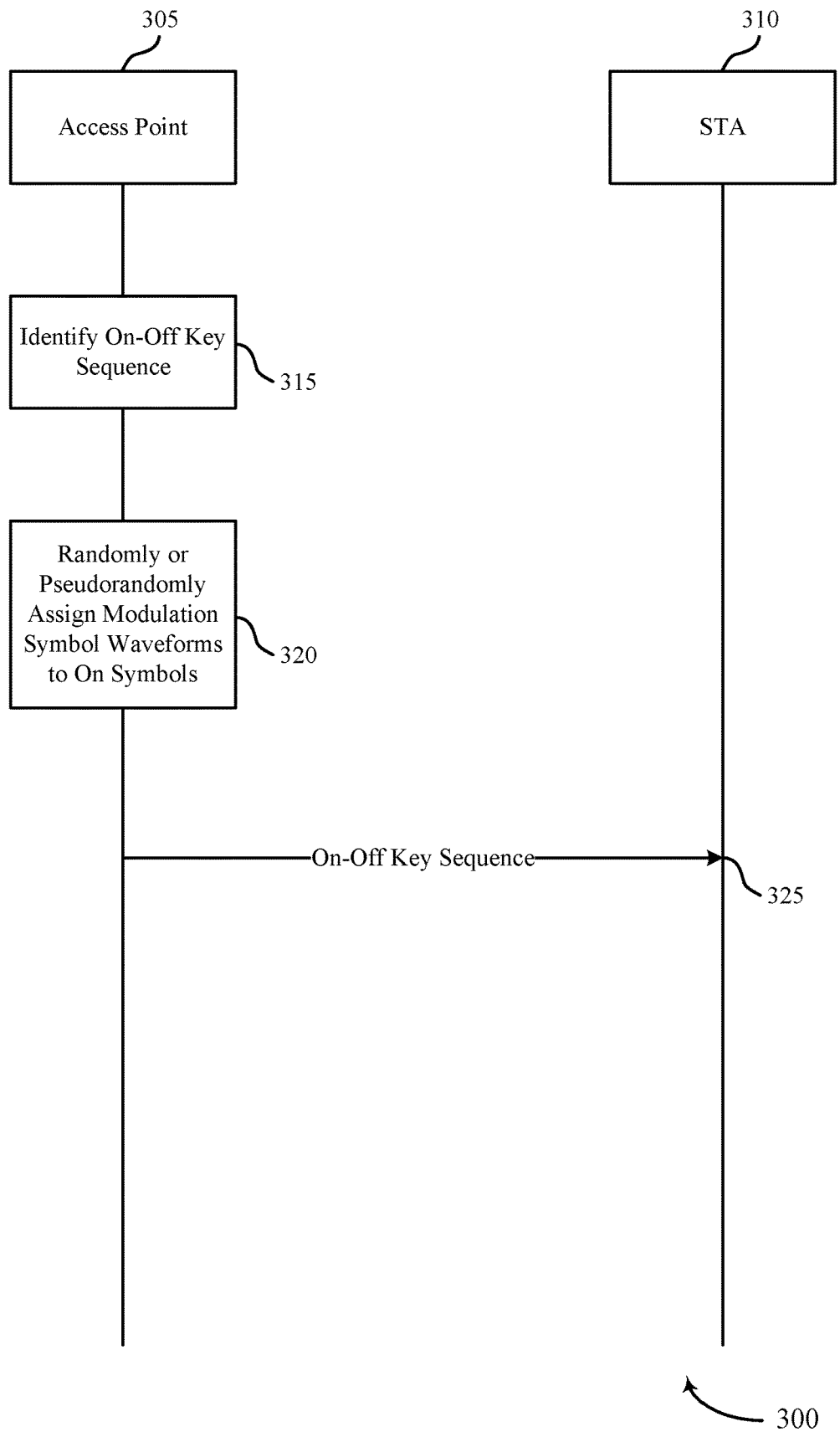
FIG. 3 illustrates an example of a communication flow in a wireless communications system that supports multicarrier on-off keying symbol randomizer in accordance with aspects of the present disclosure.

FIG. 3 illustrates an example of a communication flow 300 in a wireless communications system that supports multicarrier on-off keying symbol randomizer in accordance with aspects of the present disclosure. In some examples, communication flow 300 may implement aspects of wireless communications system 100.

The communication flow 300 shows communications between an AP 305 and a STA 310. The AP 305 may be an example of aspects of AP 105 as described with reference to FIG. 1. The STA 310 may be an example of aspects of STA 115 as described with reference to FIG. 1.

The AP 305 may identify an on-off key sequence at 315. The on-off key sequence may be a multicarrier on-off sequence. The on-off key sequence may include a plurality of on symbols and a plurality of off symbols. In some examples, the on-off key sequence may be defined in a technical specification and stored at the AP 305 (e.g., in a memory).

The AP 305 may randomly or pseudorandomly assign modulation symbol waveforms to on symbols of the on-off key sequence at 320. In some examples, the AP 305 may randomly or pseudorandomly assign modulation symbol waveforms to on symbols only. In some other examples, the AP 305 may randomly or pseudorandomly assign modulation symbol waveforms to the entire on-off key sequence, including the off symbols.

In some examples, the AP 305 may randomly or pseudorandomly assign a modulation symbol waveform to a symbol (e.g., an on symbol) based at least in part on a stored symbol. A random or pseudorandom change may be applied to the stored symbol to generate the modulation symbol waveform.

In some examples, the AP 305 may randomly or pseudorandomly assign a modulation symbol waveform to a symbol (e.g., an on symbol) by applying a random phase rotation to a stored symbol. In some examples, the AP 305 may randomly or pseudorandomly assign a modulation symbol waveform to a symbol (e.g., an on symbol) by applying a random cyclic shift to a stored symbol.

In some examples, the random phase rotation or cyclic shift may be determined based at least in part on a random or pseudorandom number (e.g., a bit or string of bits). The random or pseudorandom bit or string of bits may be generated by a random number generator such as a linear phase shift register. The linear phase shift register may be initialized based at least in part on a seed number. In some examples, the seed number may be a fixed value (e.g., a value specified in a technical standard). In some other examples, the seed number may vary (e.g., randomly or pseudorandomly). In such examples, the AP 305 may transmit the seed to the STA 310. If the STA 310 is a coherent receiver, the STA 310 may use the received seed value in compensating for the random or pseudorandom phase rotation or cyclic shift. In some other examples, the random or pseudorandom bit or string of bits may be determined based at least in part on a random or pseudorandom number (string of bits).

In some other examples, AP 305 may randomly or pseudorandomly assign a modulation symbol waveform to a symbol (e.g., an on symbol) without reference to a stored symbol. For example, the AP 305 may generate a symbol by applying a random or pseudorandom phase shift keying value to each subcarrier in a multicarrier system. The generated symbol may be an orthogonal frequency division multiplexing (OFDM) symbol, and the phase shift keying value may be a binary phase-shift keying (BPSK) value or a quadrature phase-shift keying (QPSK) value. The random or pseudorandom phase-shift keying value may be determined based at least in part on a random or pseudorandom number (e.g., a bit or string of bits). The random or pseudorandom bit or string of bits may be generated by a random number generator such as a linear phase shift register. The linear phase shift register may be initialized based at least in part on a seed number. In some examples, the seed number may be a fixed value (e.g., a value specified in a technical standard). In some other examples, the seed number may vary (e.g., randomly or pseudorandomly). In such examples, the AP 305 may transmit the seed to the STA 310. If the STA 310 is a coherent receiver, the STA 310 may use the received seed value in compensating for the random or pseudorandom phase-shift keying values. In some other examples, the random or pseudorandom bit or string of bits may be determined based at least in part on a random or pseudorandom number (e.g., string of bits).

The AP 305 may transmit the on-off key sequence 325 to the STA 310. The on-off key sequence 325 may be based at least in part on the modulation symbol waveforms randomly or pseudorandomly assigned to at least each on symbol.

Figure 4:
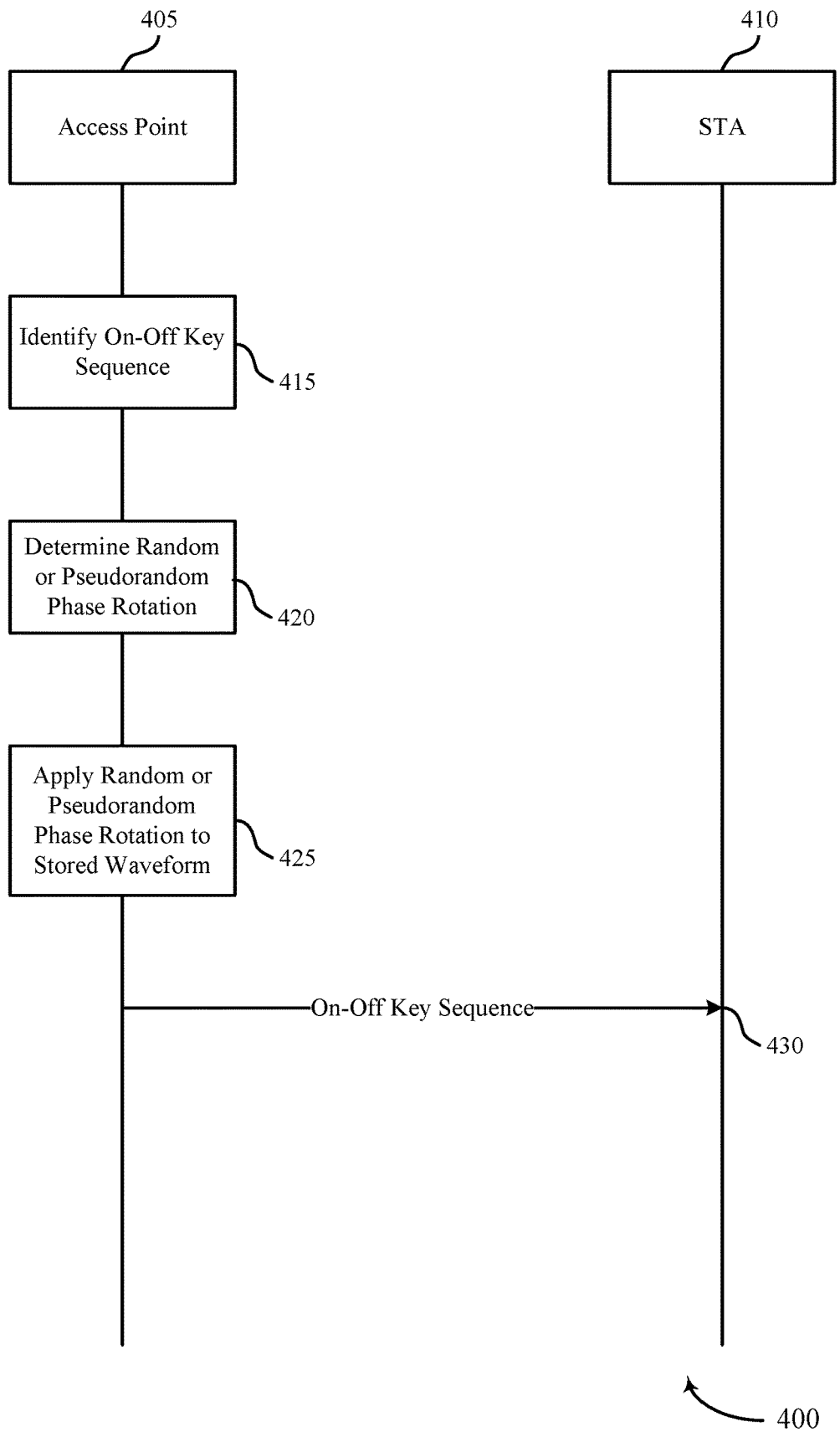
FIG. 4 illustrates an example of a communication flow in a wireless communications system that supports multicarrier on-off keying symbol randomizer in accordance with aspects of the present disclosure.

FIG. 4 illustrates an example of a communication flow 400 in a wireless communications system that supports multicarrier on-off keying symbol randomizer in accordance with aspects of the present disclosure. In some examples, communication flow 400 may implement aspects of wireless communications system 100.

The communication flow 400 shows communications between an AP 405 and a STA 410. The AP 405 may be an example of aspects of AP 105 as described with reference to FIG. 1. The STA 410 may be an example of aspects of STA 115 as described with reference to FIG. 1.

The AP 405 may identify an on-off key sequence at 415. The on-off key sequence may be a multicarrier on-off sequence. The on-off key sequence may include a plurality of on symbols and a plurality of off symbols. In some examples, the on-off key sequence may be defined in a technical specification and stored at the AP 405 (e.g., in a memory).

The AP 405 may determine a random or pseudorandom phase rotation for at least each on symbol at 420. The random or pseudorandom phase rotation may be determined based at least in part on a random number (e.g., bit or string of bits). In some examples, the random or pseudorandom number may be generated by a random number generator such as random number generator 500 described with reference to FIG. 5. In some other examples, the random or pseudorandom number may be determined based at least in part on a stored random or pseudorandom number, which may be stored at the AP 405 (e.g., in a memory).

In some examples, the AP 405 may determine the phase rotation based at least in part on a single random or pseudorandom bit (e.g., 0 or 1). For example, the AP 405 may determine a phase rotation of 0 degrees when the single bit is 0, and may determine a phase rotation of 180 degrees when the single bit is 1.

In some other examples, the AP 405 may determine the phase rotation based at least in part on a string of two random or pseudorandom bits (e.g., 00, 10, 01, 11). For example, the AP may determine a phase rotation of 1 degree when the string is 00, may determine a phase rotation of 90 degrees when the string is 10, may determine a phase rotation of 180 degrees when the string is 01, and may determine a phase rotation of 270 degrees when the string is 11.

In some other examples, the AP 405 may determine the phase rotation based at least in part on a string of three or more random or pseudorandom bits. For example, the phase rotations corresponding to a three-bit string are shown in Table 1. Other mappings and greater numbers of bits may also be used in connection with the disclosed subject matter.

TABLE 1

Exemplary Phase Rotation Mapping for Three Bit Strings

| Random or Pseudorandom String | Corresponding Phase Rotation |
|---|---|
| 000 | 0 degrees |
| 001 | 45 degrees |
| 010 | 90 degrees |
| 011 | 135 degrees |
| 100 | 180 degrees |

TABLE 1-continued

Exemplary Phase Rotation Mapping for Three Bit Strings

| Random or Pseudorandom String | Corresponding Phase Rotation |
|---|---|
| 101 | 225 degrees |
| 110 | 270 degrees |
| 111 | 315 degrees |

The AP 405 may apply the random or pseudorandom phase rotation to a stored waveform at 425. In some examples, a single stored waveform may be used for each symbol. Applying the random or pseudorandom phase rotation may correspond to randomly or pseudorandomly assigning a modulation symbol waveform from a set of candidate modulation symbol waveforms. For example, when a two-bit string is used to select the phase rotation, and the phase rotation is applied to a single stored waveform, applying the phase rotation is equivalent to randomly or pseudorandomly selecting one of four possible modulation symbol waveforms to at least each on symbol.

The AP 405 may transmit the on-off key sequence 430 to the STA 410. The on-off key sequence 430 may be based at least in part on the modulation symbol waveforms randomly or pseudorandomly assigned to at least each on symbol (e.g., based at least in part on the random or pseudorandom phase rotation applied to at least each on symbol).

Figure 5:
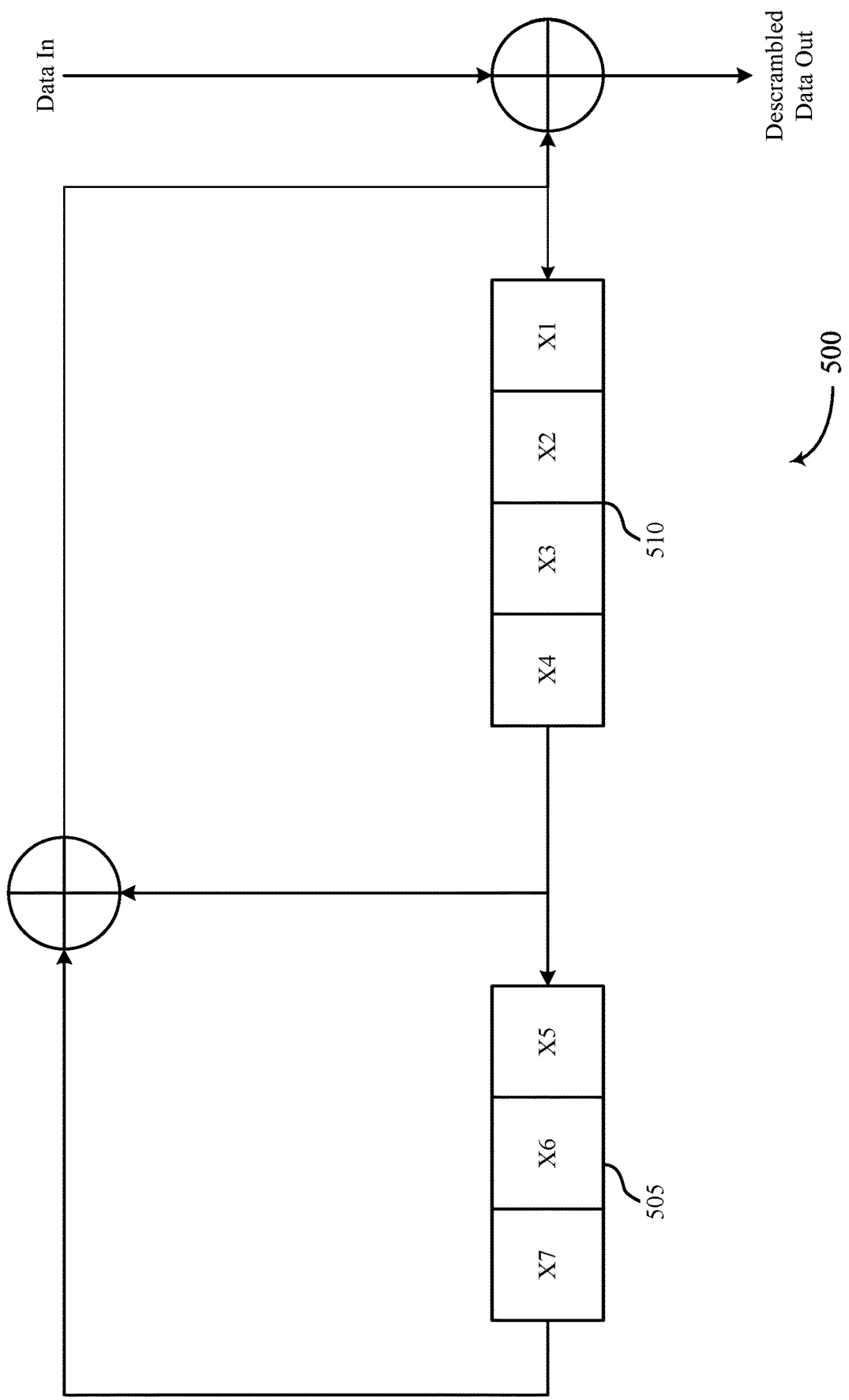
FIG. 5 illustrates an example of a random number generator in a wireless communications system that supports multicarrier on-off keying symbol randomizer in accordance with aspects of the present disclosure.

FIG. 5 illustrates an example of a random number generator 500 in a wireless communications system that supports multicarrier on-off keying symbol randomizer in accordance with aspects of the present disclosure. In some examples, random number generator 500 may implement aspects of wireless communications system 100.

The random number generator 500 may be a linear feedback shift register, which may be a linear feedback shift register as defined in the 802.11ba amendment to the Institute of Electrical and Electronics Engineers (IEEE) 802.11-2016 standard. The random number generator 500 may generate a pseudorandom sequence of bits that repeats every 127 bits. The random number generator 500 may be a component of a transmitting device, which may be an example of aspects of AP 105 described with reference to FIG. 1.

The random number generator 500 may include a register of seven bits. The seven bits may be divided into a first register 505 of three bits and a second register 510 of four bits. The pseudorandom sequence generated by the random number generator 500 may depend on the initial value of the bits in the first register 505 and the second register 510. The random number generator 500 may be initialized with a seed $X_7X_6X_5X_4X_3X_2X_1$. In some examples, the seed may be a fixed seed (e.g., may be specified in a technical standard). In some other examples, a variable seed (e.g., a random or pseudorandom seed) may be used to initialize the random number generator 500. In such examples, the variable seed may be transmitted to a receiving device, which may be an example of aspects of STA 115 as described with reference to FIG. 1. The receiving device may be a coherent receiver.

Figure 6:
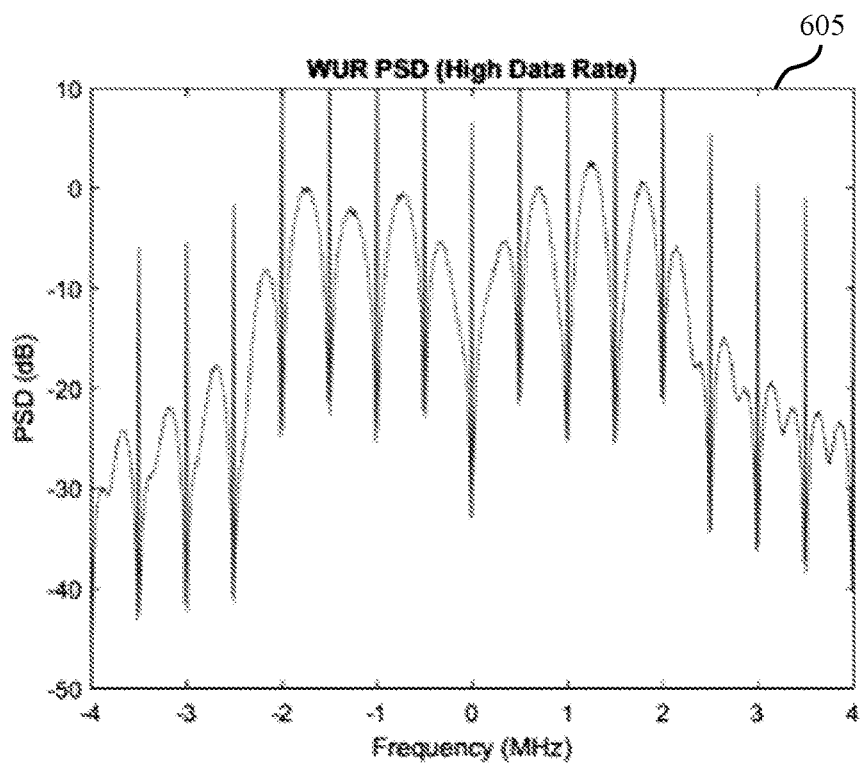
FIG. 6 illustrates an example of power spectral measurements at a high data rate in a wireless communications system that supports multicarrier on-off keying symbol randomizer in accordance with aspects of the present disclosure.
Figure 6:
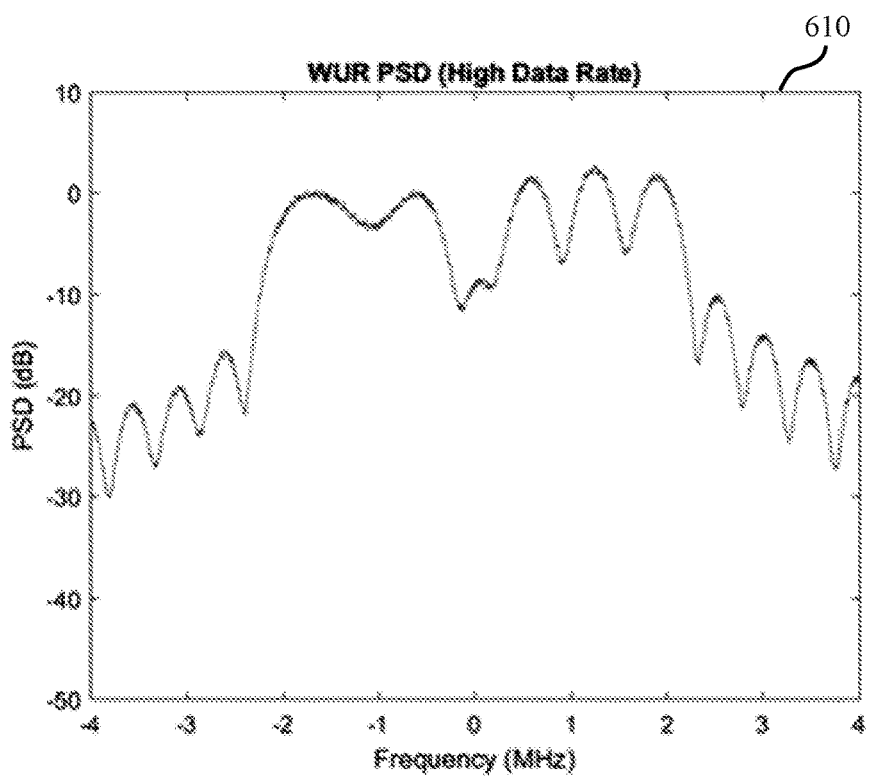

FIG. 6 illustrates an example of power spectral density measurements 600 at a high data rate in a wireless communications system that supports multicarrier on-off keying symbol randomizer in accordance with aspects of the present disclosure. In some examples, the wireless communications system may implement aspects of wireless communications system 100.

The power spectral density measurements 600 include a first graph 605 of power spectral density measurements at a low data rate and a second graph 610 of power spectral density measurements at a low data rate.

The first graph 605 shows power spectral density measurements versus frequency when a same waveform is used for each on symbol in an on-off key sequence. The first graph 605 shows a number of power spectral lines in the power spectral density, which can result in significant power in a narrow bandwidth. The second graph 610 shows power spectral density versus frequency when a random or pseudorandom phase rotation is applied to each on symbol. The second graph 610 does not show power spectral lines, which indicates that the power in narrow bandwidths may be narrowed and problems associated with high narrowband power may be mitigated.

Table 2 shows the calculated maximum power in any 3 kHz window as compared to total power, and the maximum power in any 3 kHz window if the total transmission power is 30 dBm. As shown in Table 2, in one example, the use of a same waveform leads to a maximum power in any 3 kHz window relative to the total power as −10.4 dB. When the total transmit power is 30 dBm, the maximum power in any 3 kHz window is 19.6 dBm. This exceeds the limit of 8 dBm in any 3 kHz window set by the Federal Communications Commission (FCC). In contrast, in one example, the use of waveforms with random or pseudorandom waveforms leads to a maximum power in any 3 kHz window relative to the total power as −27.0 dB. When the total transmit power is 30 dBm, the maximum power in any 3 kHz window is 3.0 dBm, which satisfies the FCC requirement.

TABLE 3

Maximum Calculated Power at High Data Rate

| Waveform | Max Power in 3 kHz Relative to Total Power (dBm) | Max Power in 3 kHz when Total Power is 30 dBm (dBm) |
|---|---|---|
| Single Waveform | −10.4 | 19.6 |
| Waveform with Random or Pseudorandom Phase Rotation | −27.0 | 3.0 |

Figure 7:
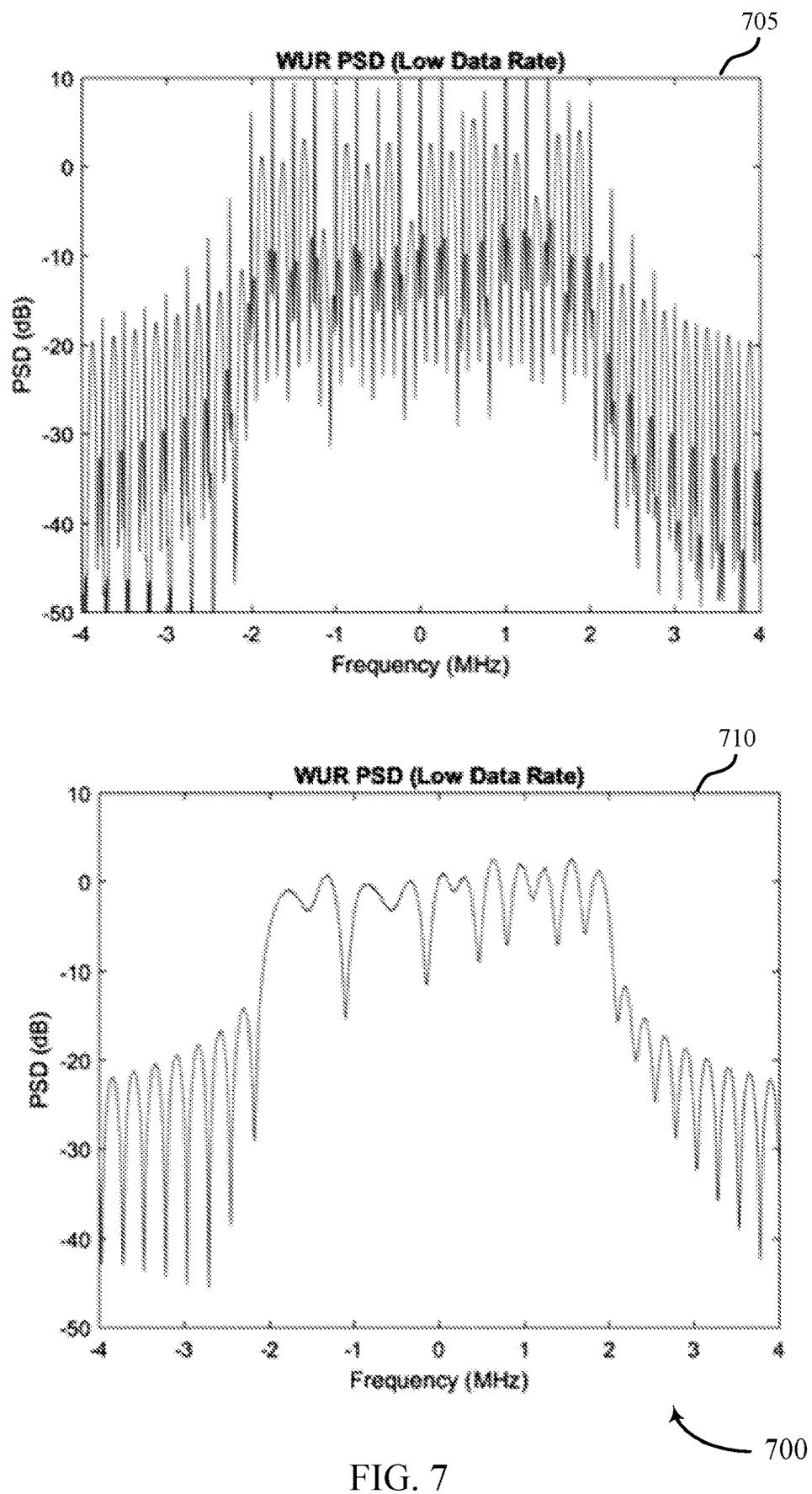
FIG. 7 illustrates an example of power spectral measurements at a low data rate in a wireless communications system that supports multicarrier on-off keying symbol randomizer in accordance with aspects of the present disclosure.

FIG. 7 illustrates an example of power spectral density measurements 700 at a low data rate in a wireless communications system that supports multicarrier on-off keying symbol randomizer in accordance with aspects of the present disclosure. In some examples, the wireless communications system may implement aspects of wireless communications system 100.

The power spectral density measurements 700 include a first graph 705 of power spectral density measurements at a high data rate and a second graph 710 of power spectral density measurements at a high data rate.

The first graph 705 shows power spectral density measurements versus frequency when a same waveform is used for each on symbol in an on-off key sequence. The first graph 705 shows a number of power spectral lines in the power spectral density, which can result in significant power in a narrow bandwidth. The second graph 710 shows power spectral density versus frequency when a random or pseudorandom phase rotation is applied to each on symbol. The second graph 710 does not show power spectral lines, which indicates that the power in narrow bandwidths may be narrowed and problems associated with high narrowband power may be mitigated.

Table 3 shows the calculated maximum power in any 3 kHz window as compared to total power, and the maximum power in any 3 kHz window if the total transmission power is 30 dBm. As shown in Table 3, in one example, the use of a same waveform leads to a maximum power in any 3 kHz window relative to the total power as −12.5 dB. When the total transmit power is 30 dBm, the maximum power in any 3 kHz window is 17.5 dBm. This exceeds the limit of 8 dBm in any 3 kHz window set by the FCC. In contrast, in one example, the use of waveforms with random or pseudorandom waveforms leads to a maximum power in any 3 kHz window relative to the total power as −27.4 dB. When the total transmit power is 30 dBm, the maximum power in any 3 kHz window is 2.6 dBm, which satisfies the FCC requirement.

TABLE 3

Maximum Calculated Power at Low Data Rate

| Waveform | Max Power in 3 kHz Relative to Total Power (dBm) | Max Power in 3 kHz when Total Power is 30 dBm (dBm) |
| --- | --- | --- |
| Single Waveform | −12.5 | 17.5 |
| Waveform with Random or Pseudorandom Phase Rotation | −27.4 | 2.6 |

Figure 8:
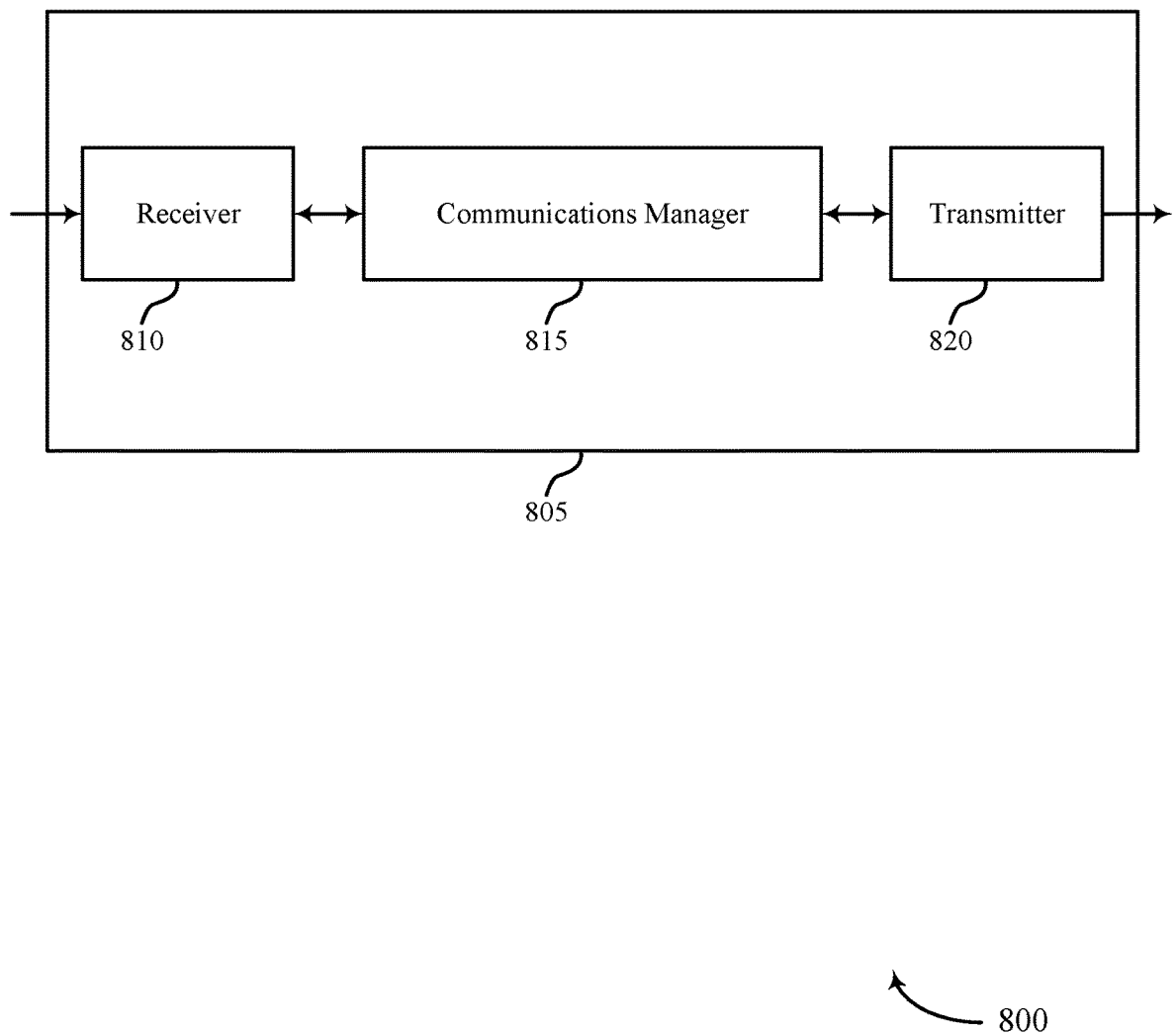
FIGS. 8 and 9 show block diagrams of devices that support multicarrier on-off keying symbol randomizer in accordance with aspects of the present disclosure.

FIG. 8 shows a block diagram 800 of a device 805 that supports multicarrier on-off keying symbol randomizer in accordance with aspects of the present disclosure. The device 805 may be an example of aspects of an AP as described herein. The device 805 may include a receiver 810, a communications manager 815, and a transmitter 820. The device 805 may also include a processor. Each of these components may be in communication with one another (e.g., via one or more buses). In some examples, communications manager 815 may be implemented by a wireless modem. Communications manager 815 may communicate with transmitter 820 via a first interface. Communications manager 815 may output signals for transmission via the first interface. In some examples, communications manager 815 may obtain signals received by receiver 810 from another wireless device via a second interface.

The receiver 810 may receive information such as packets, user data, or control information associated with various information channels (e.g., control channels, data channels, and information related to multicarrier on-off keying symbol randomizer, etc.). Information may be passed on to other components of the device. The receiver 810 may be an example of aspects of the transceiver 1120 described with reference to FIG. 11. The receiver 810 may utilize a single antenna or a set of antennas.

The communications manager 815 may identify, by an AP, a sequence of on symbols and off symbols for transmission to a WUR of a wireless device, assign a modulation symbol waveform from a set of possible modulation symbol waveforms to at least each on symbol in the sequence, where the modulation symbol waveforms are assigned to sequential on symbols in a random or pseudorandom order, and transmit the sequence to the WUR of the wireless device using multi-carrier on-off keying (MC-OOK) based on the assigned modulation symbol waveforms. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
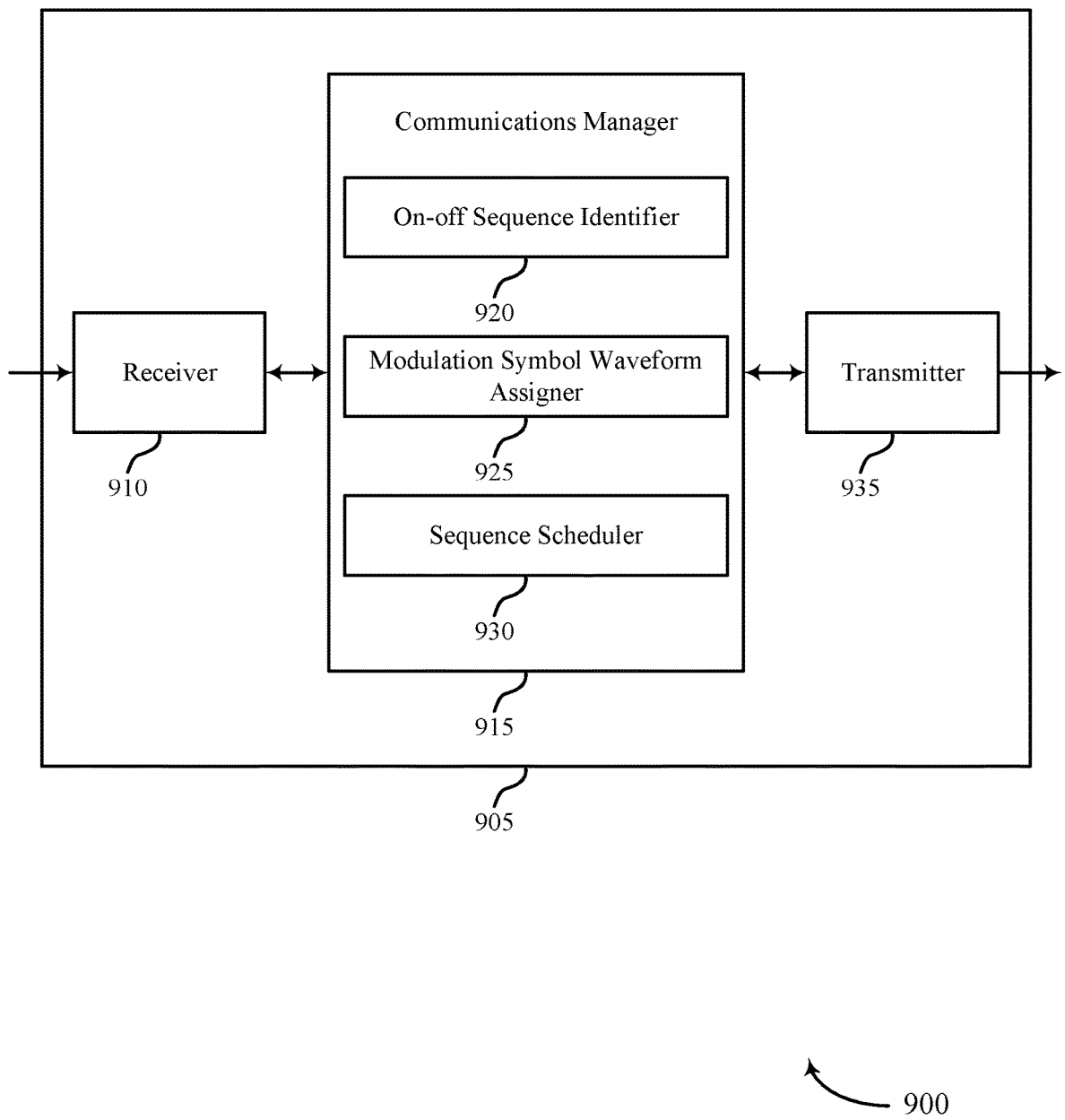

FIG. 9 shows a block diagram 900 of a device 905 that supports multicarrier on-off keying symbol randomizer in accordance with aspects of the present disclosure. The device 905 may be an example of aspects of a device 805 or an STA 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to multicarrier on-off keying symbol randomizer, etc.). Information may be passed on to other components of the device. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an on-off sequence identifier 920, a modulation symbol waveform assigner 925, and a sequence scheduler 930. The communications manager 915 may be an example of aspects of the communications manager 1110 described herein.

The on-off sequence identifier 920 may identify, by an AP, a sequence of on symbols and off symbols for transmission to a WUR of a wireless device.

The modulation symbol waveform assigner 925 may assign a modulation symbol waveform from a set of possible modulation symbol waveforms to at least each on symbol in the sequence, where the modulation symbol waveforms are assigned to sequential on symbols in a random or pseudorandom order.

The sequence scheduler 930 may transmit the sequence to the WUR of the wireless device using multi-carrier on-off keying (MC-OOK) based on the assigned modulation symbol waveforms.

The transmitter 935 may transmit signals generated by other components of the device. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
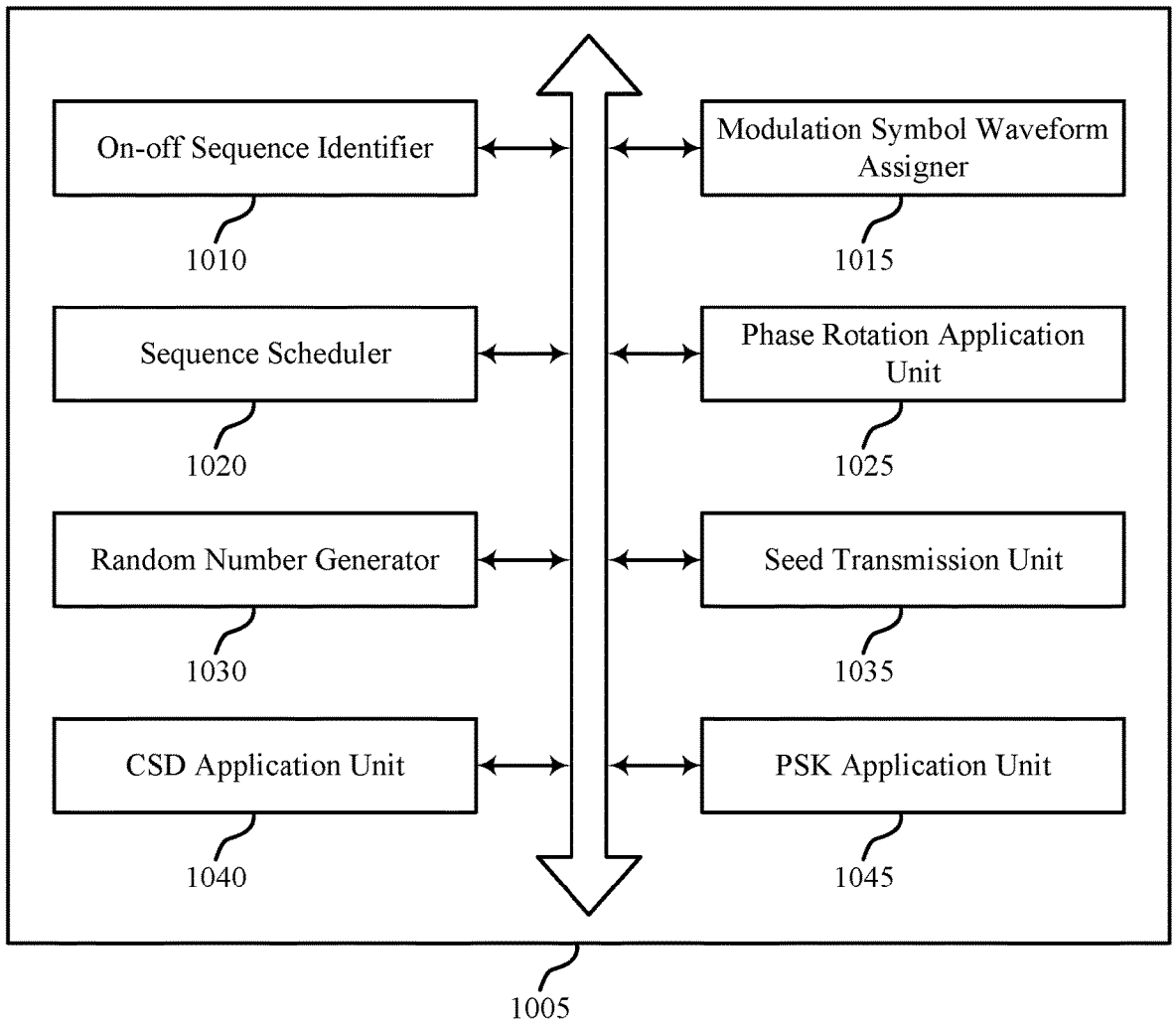
FIG. 10 shows a block diagram of a communications manager that supports multicarrier on-off keying symbol randomizer in accordance with aspects of the present disclosure.

FIG. 10 shows a block diagram 1000 of a communications manager 1005 that supports multicarrier on-off keying symbol randomizer in accordance with aspects of the present disclosure. The communications manager 1005 may be an example of aspects of a communications manager 815, a communications manager 915, or a communications manager 1110 described herein. The communications manager 1005 may include an on-off sequence identifier 1010, a modulation symbol waveform assigner 1015, a sequence scheduler 1020, a phase rotation application unit 1025, a random number generator 1030, a seed transmission unit 1035, a cyclic shift application unit 1040, and a phase shift key (PSK) application unit 1045. Each of these modules may communicate, directly or indirectly, with one another (e.g., via one or more buses).

The on-off sequence identifier 1010 may identify, by an AP, a sequence of on symbols and off symbols for transmission to a WUR of a wireless device.

The modulation symbol waveform assigner 1015 may assign a modulation symbol waveform from a set of possible modulation symbol waveforms to at least each on symbol in the sequence, where the modulation symbol waveforms are assigned to sequential on symbols in a random or pseudorandom order.

In some examples, the modulation symbol waveform assigner 1015 may assign a modulation symbol waveform from a set of possible modulation symbol waveforms to each off symbol in the sequence, where the modulation symbol waveforms are assigned to sequential symbols in the sequence in a random or pseudorandom order.

The sequence scheduler 1020 may transmit the sequence to the WUR of the wireless device using multi-carrier on-off keying (MC-OOK) based on the assigned modulation symbol waveforms.

The phase rotation application unit 1025 may apply a random or pseudorandom phase rotation to a stored modulation symbol waveform. In some examples, the phase rotation application unit 1025 may determine the random or pseudorandom phase rotation based on a random number generator. In some examples, the phase rotation application unit 1025 may determine the random or pseudorandom phase rotation based on a stored random or pseudorandom number sequence.

The random number generator 1030 may initialize the linear feedback shift register with a fixed seed. In some examples, the random number generator 1030 may initialize the linear feedback shift register with a random or pseudorandom seed.

In some cases, the random or pseudorandom number generator includes a linear feedback shift register.

The seed transmission unit 1035 may transmit the random or pseudorandom seed to the wireless device.

The cyclic shift application unit 1040 may apply a random or pseudorandom cyclic shift to a stored modulation symbol waveform.

The PSK application unit 1045 may apply a random or pseudorandom phase-shift keying value to each of a set of subcarriers of a multicarrier system to generate the modulation symbol waveform.

In some cases, the modulation symbol waveform includes an orthogonal frequency division multiplexing symbol waveform.

In some cases, the random or pseudorandom phase-shift keying value includes one of a binary phase-shift keying value and a quadrature phase-shift keying value.

Figure 11:
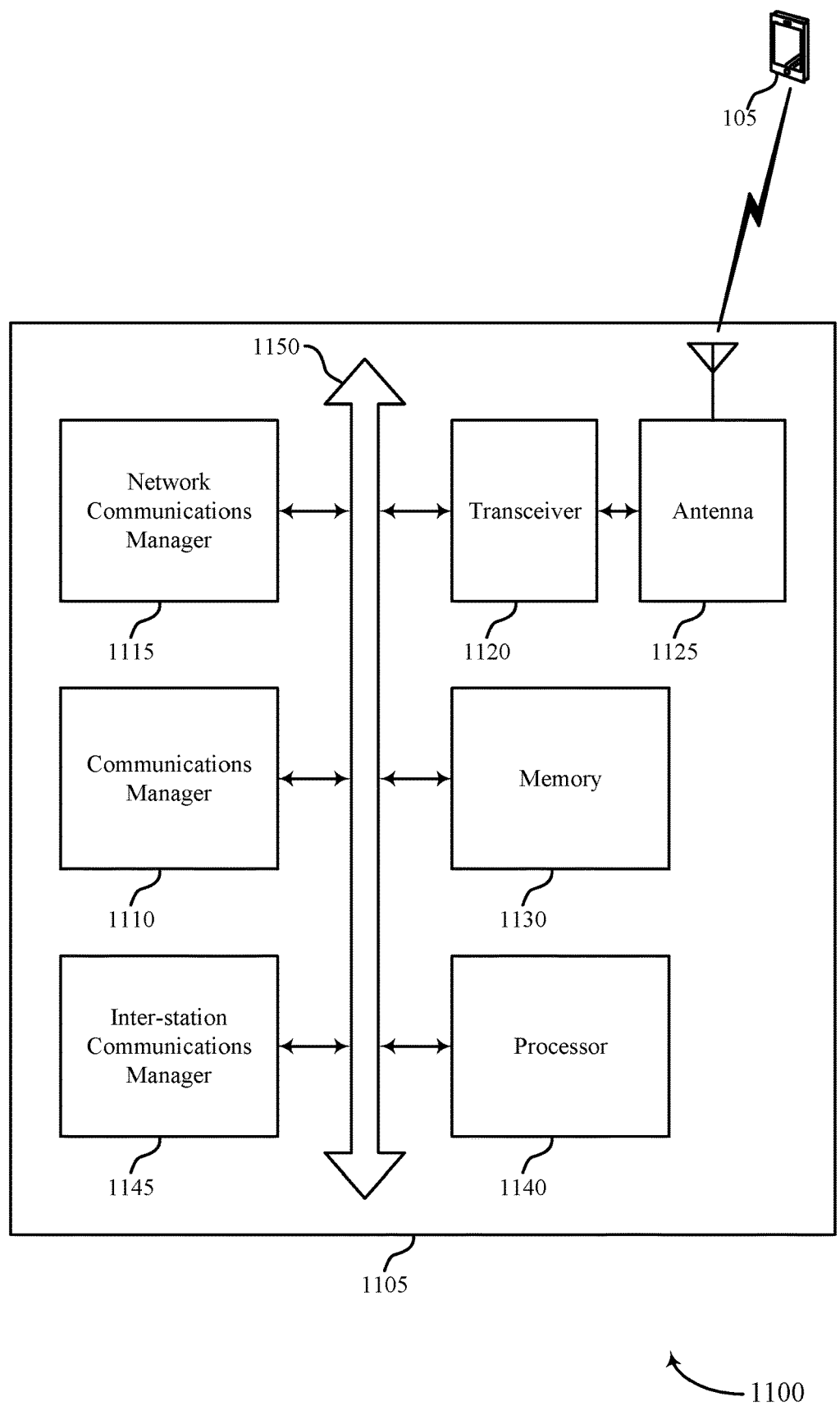
FIG. 11 shows a diagram of a system including a device that supports multicarrier on-off keying symbol randomizer in accordance with aspects of the present disclosure.

FIG. 11 shows a diagram of a system 1100 including a device 1105 that supports multicarrier on-off keying symbol randomizer in accordance with aspects of the present disclosure. The device 1105 may be an example of or include the components of device 805, device 905, or an AP as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify, by an AP, a sequence of on symbols and off symbols for transmission to a WUR of a wireless device, assign a modulation symbol waveform from a set of possible modulation symbol waveforms to at least each on symbol in the sequence, where the modulation symbol waveforms are assigned to sequential on symbols in a random or pseudorandom order, and transmit the sequence to the WUR of the wireless device using multi-carrier on-off keying (MC-OOK) based on the assigned modulation symbol waveforms.

The network communications manager 1115 may manage communications with the core network (e.g., via one or more wired backhaul links). For example, the network communications manager 1115 may manage the transfer of data communications for client devices, such as one or more STAs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM) and read only memory (ROM). The memory 1130 may store computer-readable, computer-executable code 1135 including instructions that, when executed, cause the processor to perform various functions described herein. In some cases, the memory 1130 may contain, among other things, a basic input output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into processor 1140. The processor 1140 may be configured to execute computer-readable instructions stored in a memory to perform various functions (e.g., functions or tasks supporting multicarrier on-off keying symbol randomizer).

The inter-station communications manager 1145 may manage communications with other APs 105, and may include a controller or scheduler for controlling communications with STAs 115 in cooperation with other APs 105. For example, the inter-station communications manager 1145 may coordinate scheduling for transmissions to STAs 115 for various interference mitigation techniques such as beamforming or joint transmission. In some examples, the inter-station communications manager 1145 may provide an X2 interface within a LTE/LTE-A wireless communication network technology to provide communication between APs 105.

Figure 12:
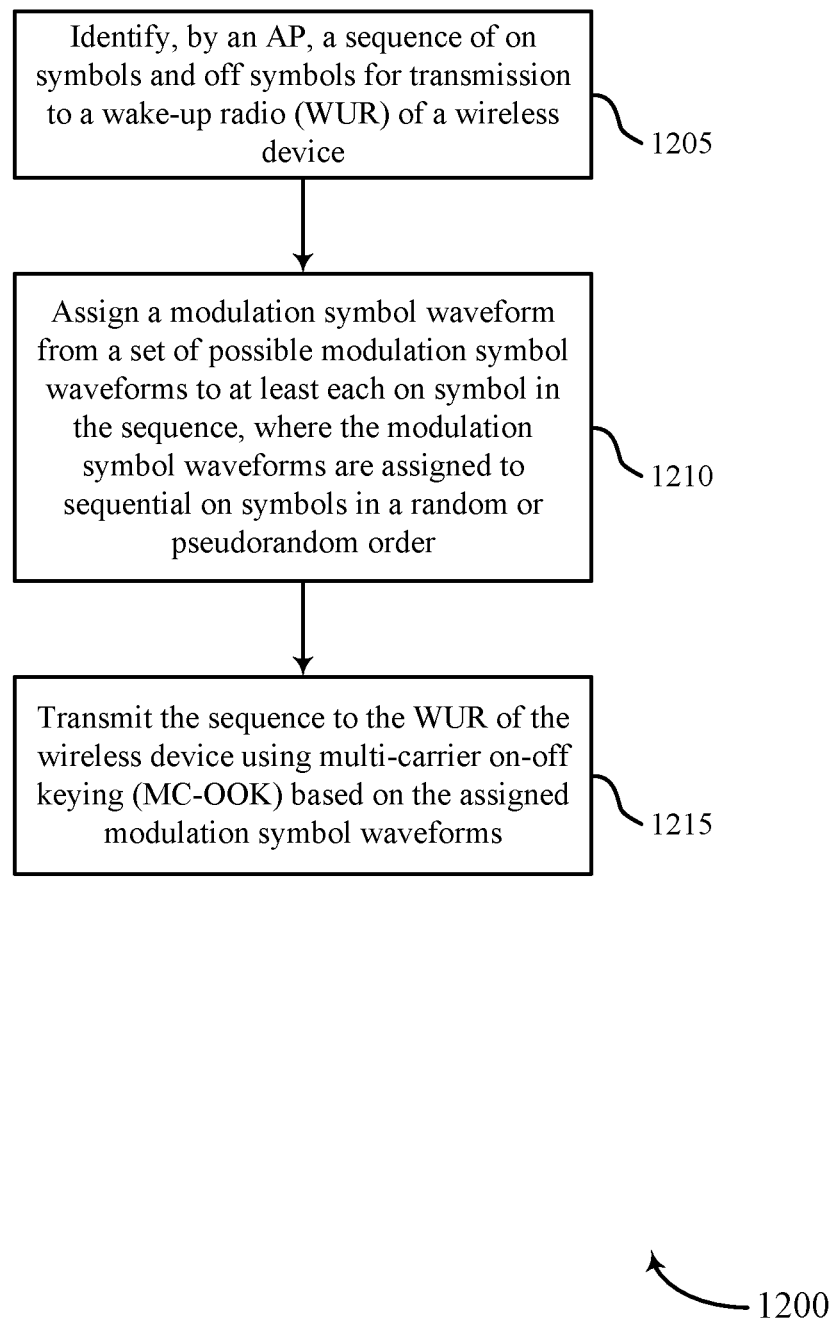
FIGS. 12 through 14 show flowcharts illustrating methods that support multicarrier on-off keying symbol randomizer in accordance with aspects of the present disclosure.

FIG. 12 shows a flowchart illustrating a method 1200 that supports multicarrier on-off keying symbol randomizer in accordance with aspects of the present disclosure. The operations of method 1200 may be implemented by an AP or its components as described herein. For example, the operations of method 1200 may be performed by a communications manager as described with reference to FIGS. 8 through 11. In some examples, an AP may execute a set of instructions to control the functional elements of the AP to perform the functions described below. Additionally, or alternatively, an AP may perform aspects of the functions described below using special-purpose hardware.

At 1205, the AP may identify, by an AP, a sequence of on symbols and off symbols for transmission to a WUR of a wireless device. The operations of 1205 may be performed according to the methods described herein. In some examples, aspects of the operations of 1205 may be performed by an on-off sequence identifier as described with reference to FIGS. 8 through 11.

At 1210, the AP may assign a modulation symbol waveform from a set of possible modulation symbol waveforms to at least each on symbol in the sequence, where the modulation symbol waveforms are assigned to sequential on symbols in a random or pseudorandom order. The operations of 1210 may be performed according to the methods described herein. In some examples, aspects of the operations of 1210 may be performed by a modulation symbol waveform assigner as described with reference to FIGS. 8 through 11.

At 1215, the AP may transmit the sequence to the WUR of the wireless device using multi-carrier on-off keying (MC-OOK) based on the assigned modulation symbol waveforms. The operations of 1215 may be performed according to the methods described herein. In some examples, aspects of the operations of 1215 may be performed by a sequence scheduler as described with reference to FIGS. 8 through 11.

Figure 13:
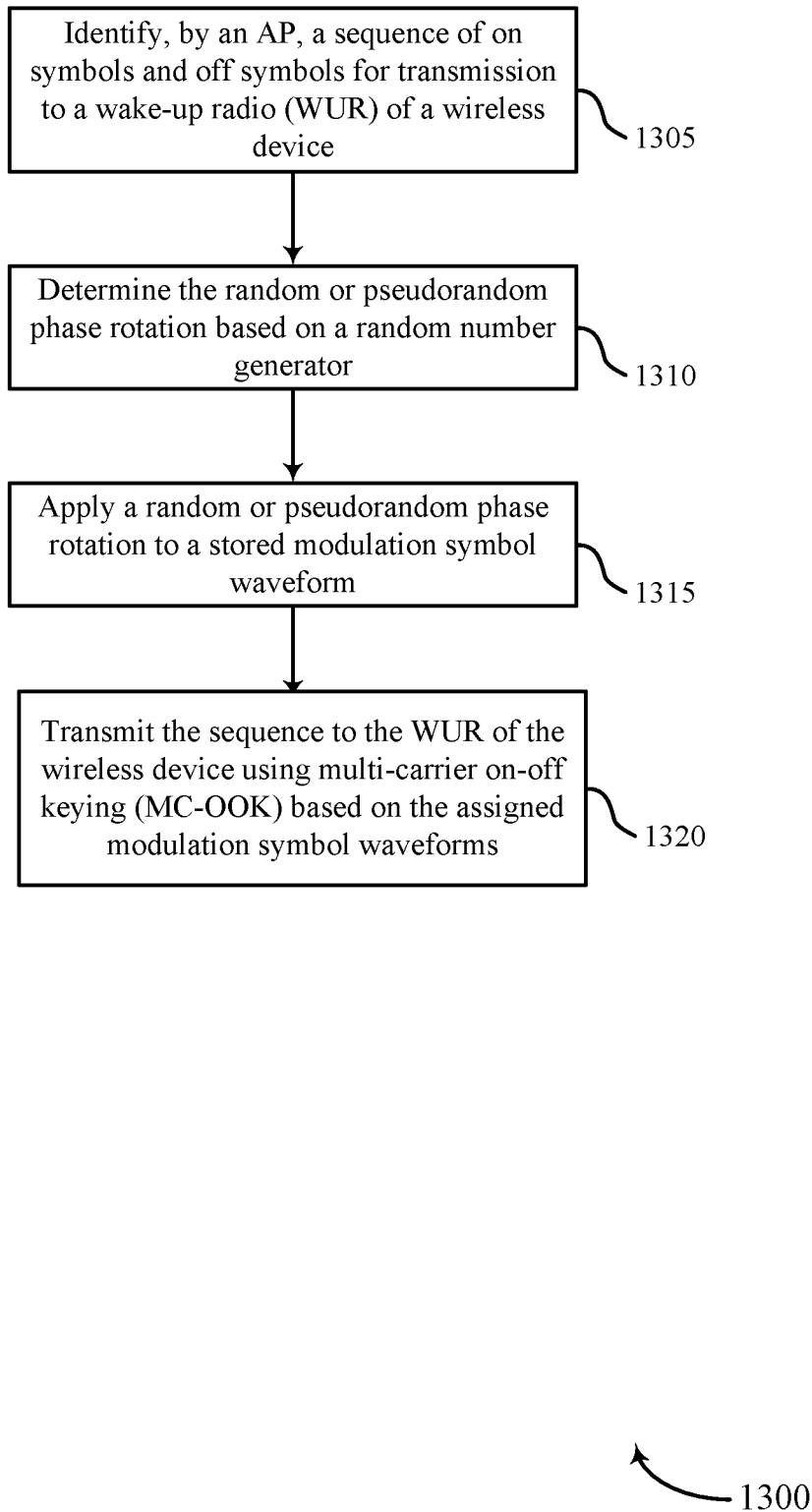

FIG. 13 shows a flowchart illustrating a method 1300 that supports multicarrier on-off keying symbol randomizer in accordance with aspects of the present disclosure. The operations of method 1300 may be implemented by an AP or its components as described herein. For example, the operations of method 1300 may be performed by a communications manager as described with reference to FIGS. 8 through 11. In some examples, an AP may execute a set of instructions to control the functional elements of the AP to perform the functions described below. Additionally, or alternatively, an AP may perform aspects of the functions described below using special-purpose hardware.

At 1305, the AP may identify, by an AP, a sequence of on symbols and off symbols for transmission to a WUR of a wireless device. The operations of 1305 may be performed according to the methods described herein. In some examples, aspects of the operations of 1305 may be performed by an on-off sequence identifier as described with reference to FIGS. 8 through 11.

At 1310, the AP may determine the random or pseudorandom phase rotation based on a random number generator. The operations of 1310 may be performed according to the methods described herein. In some examples, aspects of the operations of 1310 may be performed by a phase rotation application unit as described with reference to FIGS. 8 through 11.

At 1315, the AP may apply a random or pseudorandom phase rotation to a stored modulation symbol waveform. The operations of 1315 may be performed according to the methods described herein. In some examples, aspects of the operations of 1315 may be performed by a phase rotation application unit as described with reference to FIGS. 8 through 11.

At 1320, the AP may transmit the sequence to the WUR of the wireless device using multi-carrier on-off keying (MC-OOK) based on the assigned modulation symbol waveforms. The operations of 1320 may be performed according to the methods described herein. In some examples, aspects of the operations of 1320 may be performed by a sequence scheduler as described with reference to FIGS. 8 through 11.

Figure 14:
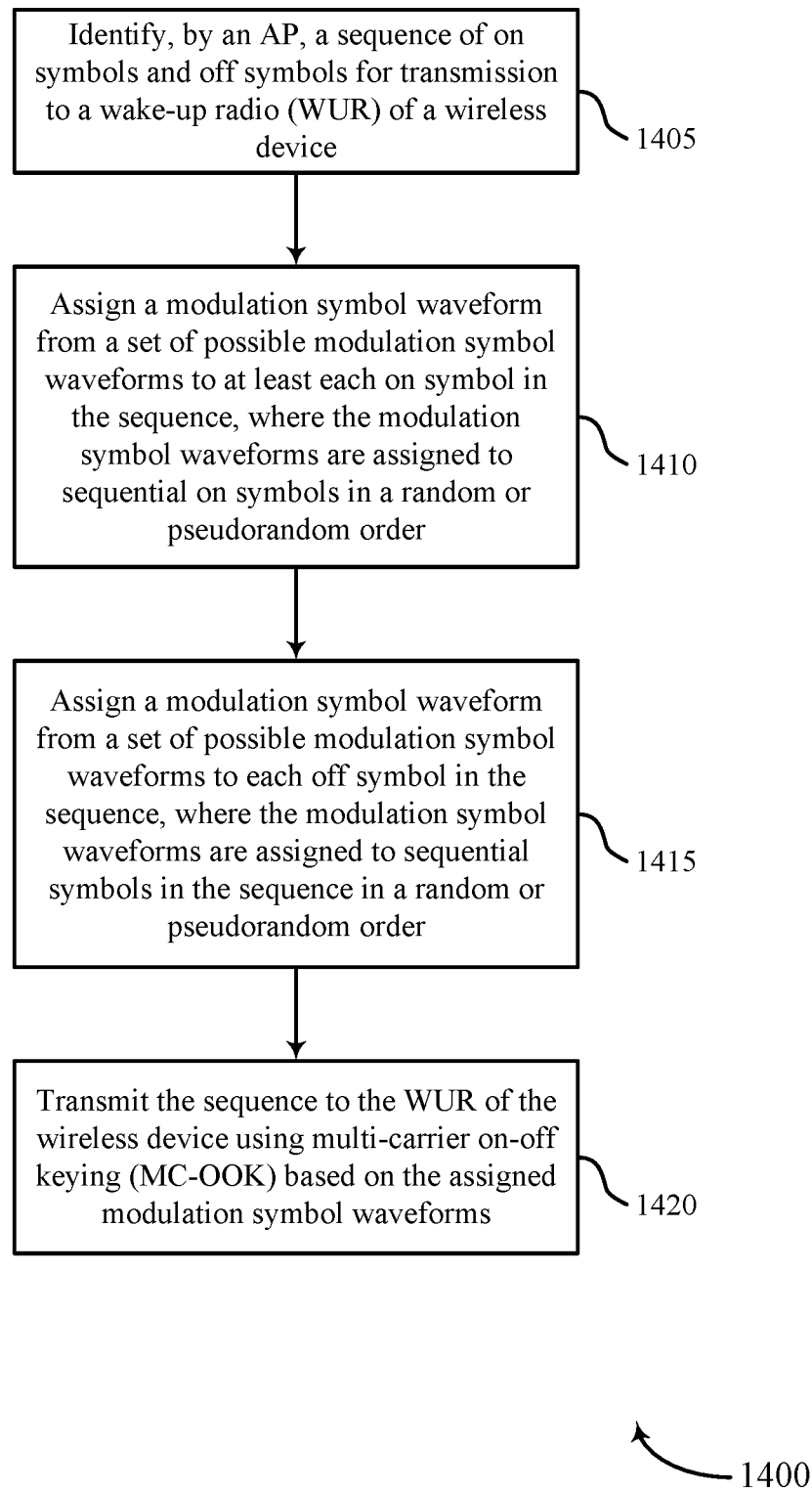

FIG. 14 shows a flowchart illustrating a method 1400 that supports multicarrier on-off keying symbol randomizer in accordance with aspects of the present disclosure. The operations of method 1400 may be implemented by an AP or its components as described herein. For example, the operations of method 1400 may be performed by a communications manager as described with reference to FIGS. 8 through 11. In some examples, an AP may execute a set of instructions to control the functional elements of the AP to perform the functions described below. Additionally, or alternatively, an AP may perform aspects of the functions described below using special-purpose hardware.

At 1405, the AP may identify, by an AP, a sequence of on symbols and off symbols for transmission to a WUR of a wireless device. The operations of 1405 may be performed according to the methods described herein. In some examples, aspects of the operations of 1405 may be performed by an on-off sequence identifier as described with reference to FIGS. 8 through 11.

At 1410, the AP may assign a modulation symbol waveform from a set of possible modulation symbol waveforms to at least each on symbol in the sequence, where the modulation symbol waveforms are assigned to sequential on symbols in a random or pseudorandom order. The operations of 1410 may be performed according to the methods described herein. In some examples, aspects of the operations of 1410 may be performed by a modulation symbol waveform assigner as described with reference to FIGS. 8 through 11.

At 1415, the AP may assign a modulation symbol waveform from a set of possible modulation symbol waveforms to each off symbol in the sequence, where the modulation symbol waveforms are assigned to sequential symbols in the sequence in a random or pseudorandom order. The operations of 1415 may be performed according to the methods described herein. In some examples, aspects of the operations of 1415 may be performed by a modulation symbol waveform assigner as described with reference to FIGS. 8 through 11.

At 1420, the AP may transmit the sequence to the WUR of the wireless device using multi-carrier on-off keying (MC-OOK) based on the assigned modulation symbol waveforms. The operations of 1420 may be performed according to the methods described herein. In some examples, aspects of the operations of 1420 may be performed by a sequence scheduler as described with reference to FIGS. 8 through 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, by a first wireless device, a sequence of on symbols and off symbols for transmission to a wake-up radio (WUR) of a second wireless device;
   determining a random or pseudorandom cyclic shift based at least in part on a random or pseudorandom number comprising a bit or a string of bits generated by a random number generator;
   assigning a modulation symbol waveform from a set of possible modulation symbol waveforms to at least each on symbol in the sequence, wherein the modulation symbol waveforms are assigned to sequential on symbols in a random or pseudorandom order, and wherein assigning the modulation symbol waveform comprises applying the random or pseudorandom cyclic shift to a stored modulation symbol waveform; and
   transmitting the sequence to the WUR of the second wireless device using multi-carrier on-off keying (MC-OOK) based at least in part on the assigned modulation symbol waveforms.

2. The method of claim 1, wherein the random or pseudorandom number generator comprises a linear feedback shift register.

3. The method of claim 2, wherein determining the random or pseudorandom cyclic shift comprises:
   initializing the linear feedback shift register with a fixed seed.

4. The method of claim 2, wherein determining the random or pseudorandom cyclic shift comprises:
   initializing the linear feedback shift register with a random or pseudorandom seed.

5. The method of claim 4, further comprising:
   transmitting the random or pseudorandom seed to the second wireless device.

6. The method of claim 1, wherein assigning the modulation symbol waveform comprises:
   applying a random or pseudorandom phase-shift keying value to each of a plurality of subcarriers of a multi-carrier system to generate the modulation symbol waveform.

7. The method of claim 6, wherein:
   the modulation symbol waveform comprises an orthogonal frequency division multiplexing symbol waveform; and
   the random or pseudorandom phase-shift keying value comprises one of a binary phase-shift keying value and a quadrature phase-shift keying value.

8. The method of claim 1, further comprising:
   assigning a modulation symbol waveform from a set of possible modulation symbol waveforms to each off symbol in the sequence, wherein the modulation symbol waveforms are assigned to sequential symbols in the sequence in a random or pseudorandom order.

9. A first wireless device, comprising:
   an interface; and
   a wireless modem configured to:
   identify a sequence of on symbols and off symbols for transmission to a wake-up radio (WUR) of a second wireless device;
   determine a random or pseudorandom cyclic shift based at least in part on a random or pseudorandom number comprising a bit or a string of bits generated by a random number generator;
   assign a modulation symbol waveform from a set of possible modulation symbol waveforms to at least each on symbol in the sequence, wherein the modulation symbol waveforms are assigned to sequential on symbols in a random or pseudorandom order, and wherein assigning the modulation symbol waveform comprises applying the random or pseudorandom cyclic shift to a stored modulation symbol waveform; and
   output the sequence over the interface for transmission to the WUR of the second wireless device using multi-carrier on-off keying (MC-OOK) based at least in part on the assigned modulation symbol waveforms.

10. The first wireless device of claim 9, wherein the random or pseudorandom number generator comprises a linear feedback shift register.

11. The first wireless device of claim 10, wherein the wireless modem is further configured to:
    initialize the linear feedback shift register with a fixed seed.

12. The first wireless device of claim 10, wherein the wireless modem is further configured to:
    initialize the linear feedback shift register with a random or pseudorandom seed.

13. The first wireless device of claim 12, wherein the wireless modem is further configured to:
    transmit the random or pseudorandom seed to the second wireless device.

14. The first wireless device of claim 9, wherein the wireless modem is further configured to:
    determine the random or pseudorandom cyclic shift based at least in part on a stored random or pseudorandom number sequence.

15. The first wireless device of claim 9, wherein the wireless modem is further configured to:

apply a random or pseudorandom phase-shift keying value to each of a plurality of subcarriers of a multi-carrier system to generate the modulation symbol waveform.

16. The first wireless device of claim 15, wherein:
the modulation symbol waveform comprises an orthogonal frequency division multiplexing symbol waveform; and
the random or pseudorandom phase-shift keying value comprises one of a binary phase-shift keying value and a quadrature phase-shift keying value.

17. The first wireless device of claim 9, wherein the wireless modem is further configured to:
assign a modulation symbol waveform from a set of possible modulation symbol waveforms to each off symbol in the sequence, wherein the modulation symbol waveforms are assigned to sequential symbols in the sequence in a random or pseudorandom order.

18. An apparatus for wireless communication, comprising:
means for identifying, by a first wireless device a sequence of on symbols and off symbols for transmission to a wake-up radio (WUR) of a second wireless device;
means for determining a random or pseudorandom cyclic shift based at least in part on a random or pseudorandom number comprising a bit or a string of bits generated by a random number generator;
means for assigning a modulation symbol waveform from a set of possible modulation symbol waveforms to at least each on symbol in the sequence, wherein the modulation symbol waveforms are assigned to sequential on symbols in a random or pseudorandom order, and wherein the means for assigning the modulation symbol waveform from the set of possible modulation symbol waveforms comprises means for applying the random or pseudorandom cyclic shift to a stored modulation symbol waveform; and
means for transmitting the sequence to the WUR of the second wireless device using multi-carrier on-off keying (MC-OOK) based at least in part on the assigned modulation symbol waveforms.

19. A non-transitory computer-readable medium storing code for wireless communication, the code comprising instructions executable by a processor to:
identify, by a first wireless device, a sequence of on symbols and off symbols for transmission to a wake-up radio (WUR) of a second wireless device;
determine a random or pseudorandom cyclic shift based at least in part on a random or pseudorandom number comprising a bit or a string of bits generated by a random number generator;
assign a modulation symbol waveform from a set of possible modulation symbol waveforms to at least each on symbol in the sequence, wherein the modulation symbol waveforms are assigned to sequential on symbols in a random or pseudorandom order, and wherein assigning the modulation symbol waveform comprises applying the random or pseudorandom cyclic shift to a stored modulation symbol waveform; and
transmit the sequence to the WUR of the second wireless device using multi-carrier on-off keying (MC-OOK) based at least in part on the assigned modulation symbol waveforms.

20. The non-transitory computer-readable medium of claim 19, wherein the random or pseudorandom number generator comprises a linear feedback shift register.

* * * * *